United States Patent
McCormack et al.

(10) Patent No.: US 11,313,148 B2
(45) Date of Patent: Apr. 26, 2022

(54) STAKE INSERTION AND REMOVAL TOOL

(71) Applicant: Monjo Systems Ltd, Carlow (IE)

(72) Inventors: Tom McCormack, Carlow (IE); John Eustace, Carlow (IE)

( * ) Notice: Subject to any disclaimer, the term of this patent is extended or adjusted under 35 U.S.C. 154(b) by 308 days.

(21) Appl. No.: 16/675,349

(22) Filed: Nov. 6, 2019

(65) Prior Publication Data

US 2020/0149314 A1 May 14, 2020

Related U.S. Application Data

(60) Provisional application No. 62/760,176, filed on Nov. 13, 2018.

(51) Int. Cl.
*E04H 17/26* (2006.01)
(52) U.S. Cl.
CPC ......... *E04H 17/263* (2013.01); *E04H 17/265* (2013.01)
(58) Field of Classification Search
CPC ........ E04H 17/263; E04H 17/265; A01B 1/16
See application file for complete search history.

(56) References Cited

U.S. PATENT DOCUMENTS

| 8,413,959 B2* | 4/2013 | Bloswick ............... E02D 11/00 254/30 |
| 9,095,087 B2* | 8/2015 | Carlino .................... A01B 1/18 |
| 2017/0058559 A1* | 3/2017 | Martin ..................... E02D 7/00 |

* cited by examiner

*Primary Examiner* — Lynn E Schwenning
(74) *Attorney, Agent, or Firm* — Frank Marino

(57) ABSTRACT

A stake insertion and removal tool including a vertically extending pole portion having an upper end for grasping and a lower end comprising a fixed clamping surface, a clamping portion connected to the pole portion approximate the lower end by linkage, movable relative to the pole portion through the linkage, and having a step and a movable clamping surface. A downward force on the step forces the movable clamping portion toward the fixed clamping portion through the linkage, thereby forcing the movable clamping surface toward the fixed clamping surface, to grasp a stake placed therebetween as the downward force urges the stake into ground there-below.

20 Claims, 5 Drawing Sheets

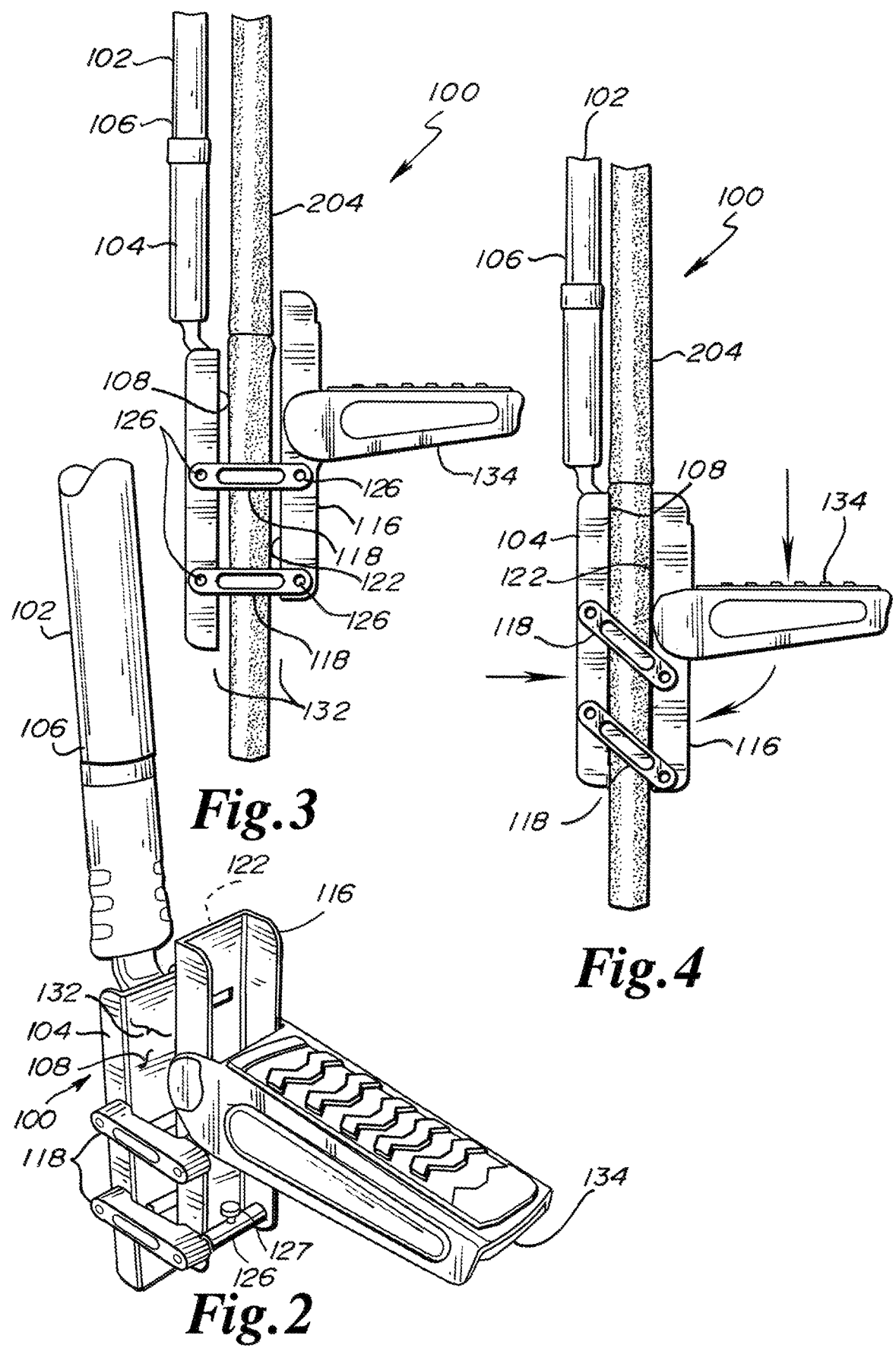

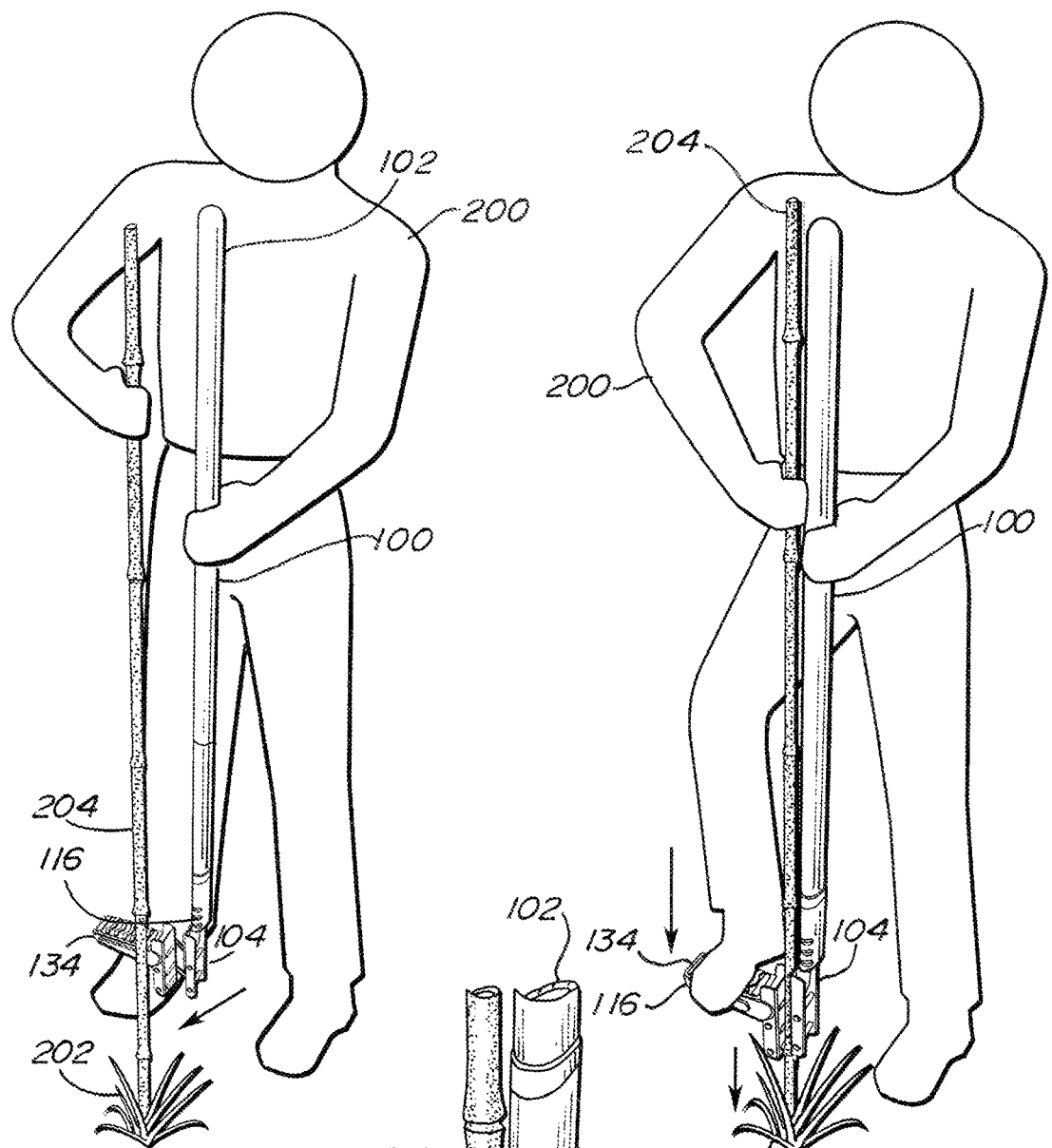
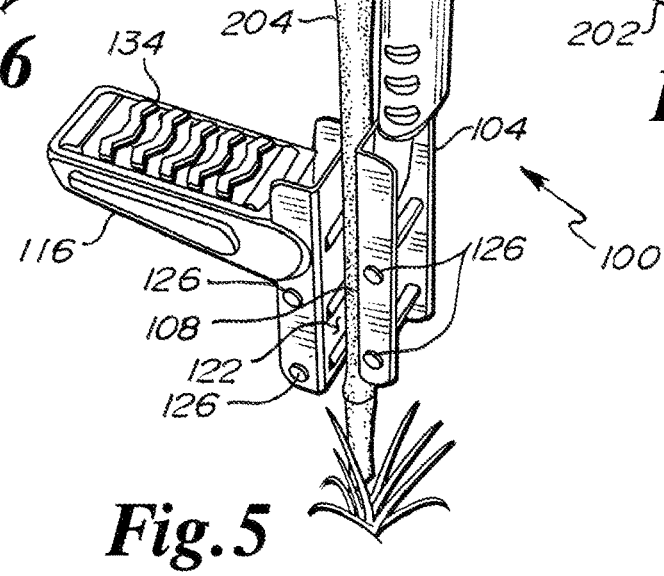
Fig. 6
Fig. 7
Fig. 5

STAKE INSERTION AND REMOVAL TOOL

FIELD OF THE INVENTION

The present invention is related to gardening and to tools for gardening. More specifically, the invention is related to the insertion into the ground of support stakes, such as those used to support plants in a garden, and the removal thereof.

BACKGROUND OF THE INVENTION

A common and age-old task is use of stakes such as those used to support garden plants or to support perimeter pest fencing around a garden. And a problem related thereto is the effort required to insert those stakes into the ground at the start of the gardening season and to remove them at the end. Such typically requires bending over and applying the weight of the upper body to push the stake into the ground near the bottom of the stake, which is a common cause of post-gardening backache. While stakes may be hammered into the ground from atop while the gardener stands upright, such typically results in damage to the stakes which prevents their reuse in subsequent years. Also, the hammering of shorter stakes, such as those used to support shorter plants still requires one to bend down, and the hammering of taller stakes, such as those used to support taller plants, is awkward, dangerous and sometimes not possible.

There is the need to provide a means for easing the insertion and removal of gardening stakes without causing backache, and such is an object of the present invention. There is the need to provide a means for easing the insertion and removal of gardening stakes without damaging the stakes, and such is an object of the present invention There is the need to provide a means for allowing the gardener to use his or her weight as the insertion force for such stakes, and such is an object of the present invention. There is the need to provide a means for insertion of stakes of various diameters and cross-sectional shapes, and such is an object of the present invention. There is the need to provide a means for insertion of stakes of various lengths, and such is an object of the present invention. There is the need to provide a removal means that is easily attachable to installed posts, stakes, poles, rods etc., to assist in pulling them from the ground with ease and without damage, allowing for reuse, and such is an object of the present invention. There is the need to provide an insertion means and a removal means in a singular tool, and such is an object of the invention.

Further needs and objects will become apparent upon perusal of the disclosure herein.

SUMMARY OF THE INVENTION

The invention may be embodied in or practiced using a stake insertion and removal tool which engages stakes of various cross-sectional diameters and shapes near to the base of the stack, employs the user's weight to firmly grasp the stake, and employs the user's weight to drive the stake into the ground, all while the users stands comfortably upright and without requiring any "back strength" from the user.

The invention may be embodied in or practiced using a stake insertion and removal tool having a vertically extending pole portion with an upper end for grasping and a lower end including a fixed clamping surface. A clamping portion may be connected to the pole portion approximate the lower end by linkage, movable relative to the pole portion through the linkage, and including a step and a movable clamping surface, whereby a downward force on the step forces the movable clamping portion toward the fixed clamping portion through the linkage, thereby forcing the movable clamping surface toward the fixed clamping surface, to grasp a stake placed therebetween as the downward force urges the stake into ground there-below.

The fixed and movable clamping surfaces may be substantially planar and may include grip-enhancing features, and the tool may further include springs arranged for biasing the movable clamping surface away from the fixed clamping surface. The grip-enhancing features may be from the group including teeth, knurling, non-slip texturing, and non-slip coating.

The movable clamping surface may be substantially parallel to the fixed clamping surface. The movable clamping portion may be movable relative to the fixed clamping surface in a collapsing parallelogram relationship, thereby maintaining the clamping surfaces parallel to each other during relative movement. The step may extend outwardly from the clamping portion perpendicular to the movable clamping surface and may have a step surface there-atop. The step surface may be substantially planar and may include non-slip features. The non-slip features may be from the group including teeth, knurling, non-slip texturing, and non-slip coating.

The fixed and movable clamping surfaces may be vertically disposed and the step surface may be horizontally disposed. The lower end, linkage, and clamping portion may be removable as a singular subassembly from the upper end of the vertically extending pole portion, and the singular subassembly may be arranged, when disposed upside-down, such that an upward force on the step biases the movable clamping portion toward the fixed clamping portion through the linkage, thereby forcing the movable clamping surface toward the fixed clamping surface, to grasp the stake placed therebetween as the upward force urges the stake from the ground.

The linkage may include a spring to bias the movable clamping surface away from the fixed clamping surface and a pivot limiter to stop movement of the movable clamping surface away from the fixed clamping surface when a predetermine gap is achieved there-between.

Further features and aspects of the invention are disclosed with more specificity in the detailed description and drawings provided herein.

BRIEF DESCRIPTION OF THE DRAWINGS

FIG. 2 is a partial perspective view of the tool of FIG. 1;

FIG. 3 is a partial side view of the tool of FIG. 1 preparing to grasp a stake;

FIG. 4 is a partial side view of the tool of FIG. 1 grasping the stake;

FIG. 5 is a perspective view of the tool of FIG. 1 grasping the stake;

FIG. 6 is a view of a user placing the stake in the desired location in preparation for insertion into the ground;

FIG. 7 is a view of the user inserting the stake into the ground using the tool of FIG. 1;

DESCRIPTION OF AN EXEMPLARY EMBODIMENT

Figure 1:
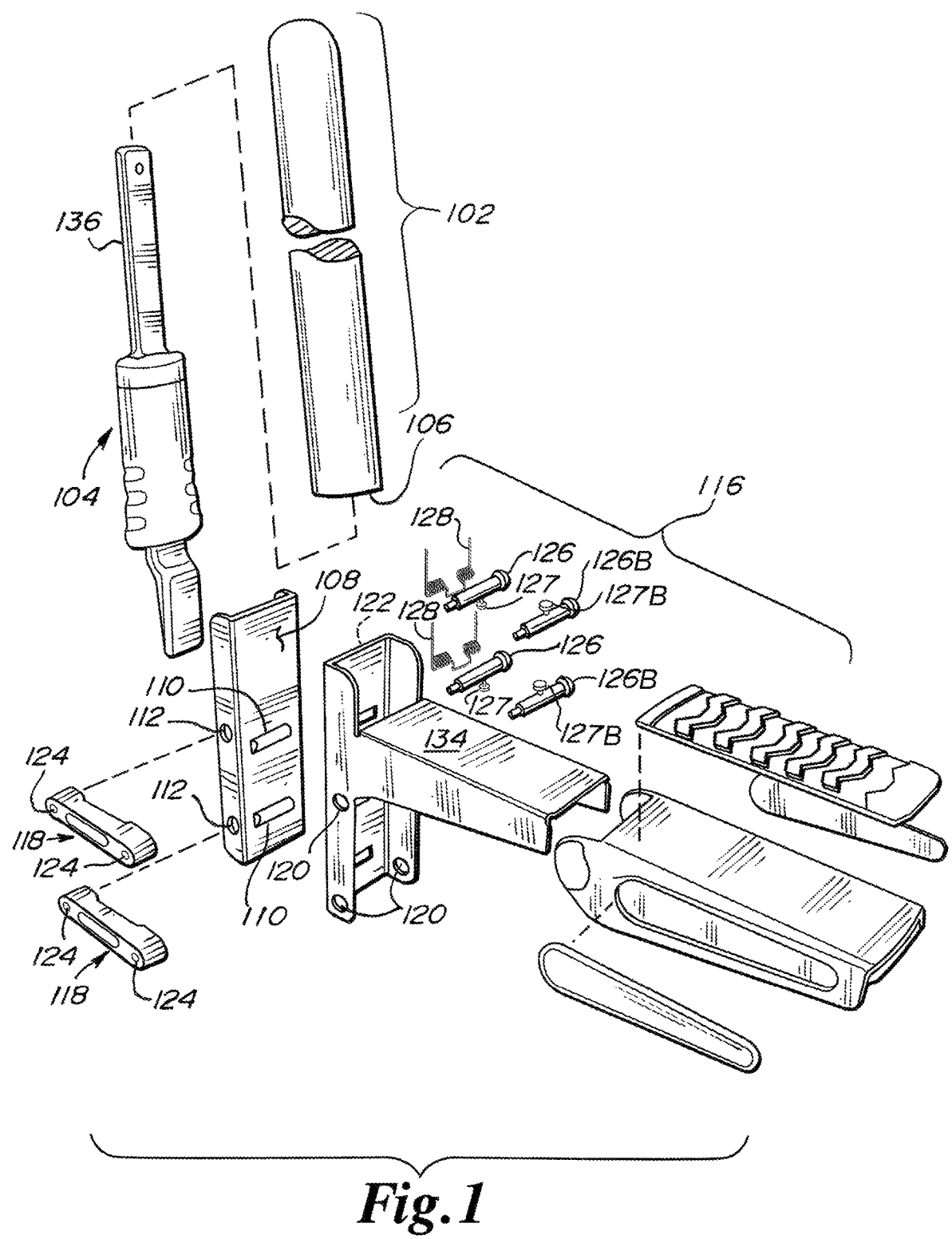
FIG. 1 is an exploded view of a stake insertion and removal tool according to a first exemplary embodiment of the invention.

Referring first to FIGS. 1 and 2, a stake insertion and removal tool 100 according to an exemplary embodiment of the invention is shown. The tool has a vertically extending pole portion including pole 102 and fixed clamping member 104. The pole extends vertically upwardly from the fixed clamping member so that the pole is adapted to be grasped by a user 200, as seen in FIGS. 6 and 7, and is preferably made of aluminum tubing, or wood . . . like an ordinary broomstick or such. The fixed clamping member extends downwardly from the pole's lower end 106 towards the ground 202. The fixed clamping member includes a fixed vertical clamping surface 108, which includes teeth 110. As an alternative to the teeth, the fixed clamping surface (and a later described movable clamping surface), may include knurling, non-slip texturing, or a non-slip coating such as rubber. The fixed clamping member also includes pivot holes 112.

The tool further includes a movable clamping portion 116 movably connected to the fixed clamping member by links 118. The movable clamping portion also includes pivot holes 120 and a movable vertical clamping surface 122, which also includes teeth.

The links extend from the pivot holes of the fixed clamping member to the pivot holes of the movable clamping portion and include pin-receiving holes 124 near each end which align with the associated pivot holes. Pivot pins 126 extend loosely through the pivot holes of the fixed clamping member and are pressed fixedly into the associated pin-receiving holes of the links, as shown in FIG. 1, while passing through torsions springs 128. Pivot pins 126B extend loosely through the pivot holes of the movable clamping portion and are pressed fixedly into the associated pin-receiving holes of the links, as shown in FIG. 1 so that the movable clamping portion is pivotably attached the fixed clamping member through the links Screws 127 are then inserted into pivot pins 126 in engagement with the pre-loaded torsion springs, arranged to normally bias the movable clamping portion away from the fixed clamping member and stop pins 127B are inserted into pivot pins 126B to serve as pivot limiters. The stop pins prevent further rotation of the links when a maximum stake-receiving gap 132 is reached between the fixed and movable clamping surfaces, which is wide enough to receive a maximum-sized anticipated gardening stake 204, as seen in FIG. 3. The links and clamping surfaces form a flexible parallelogram arrangement so that the clamping surfaces always remain parallel to each other.

Figure 10:
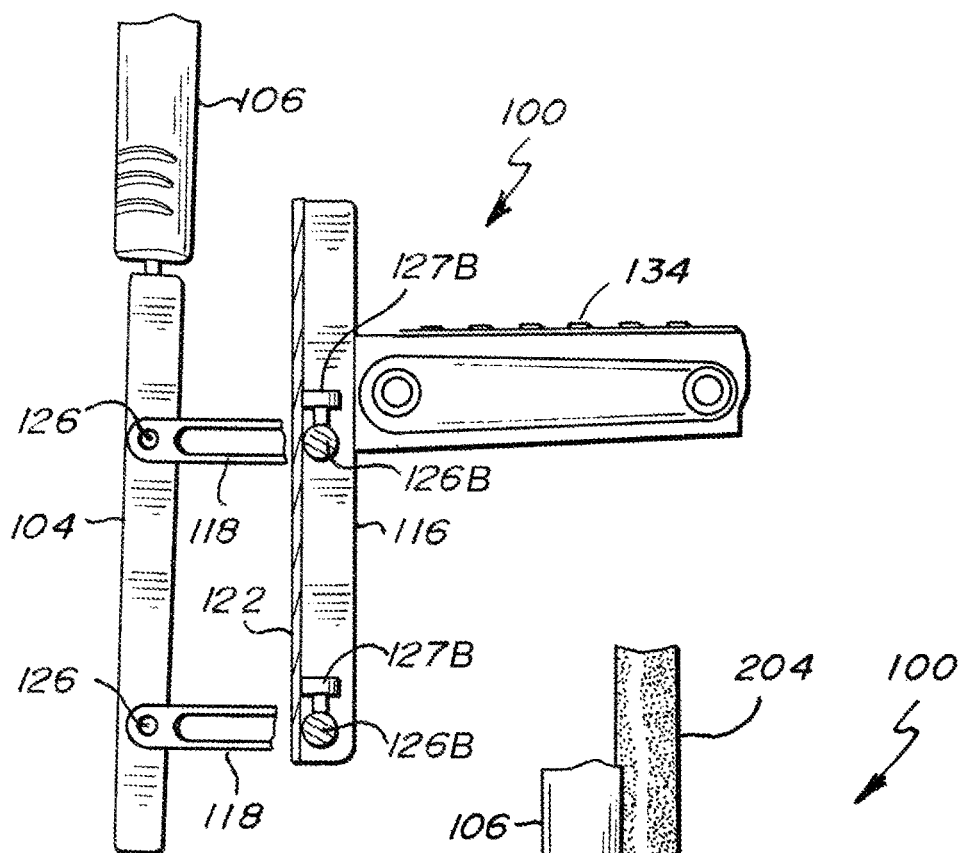
FIG. 10 is a partial cross section of the tool of FIG. 1 preparing to grasp a stake.
Figure 11:
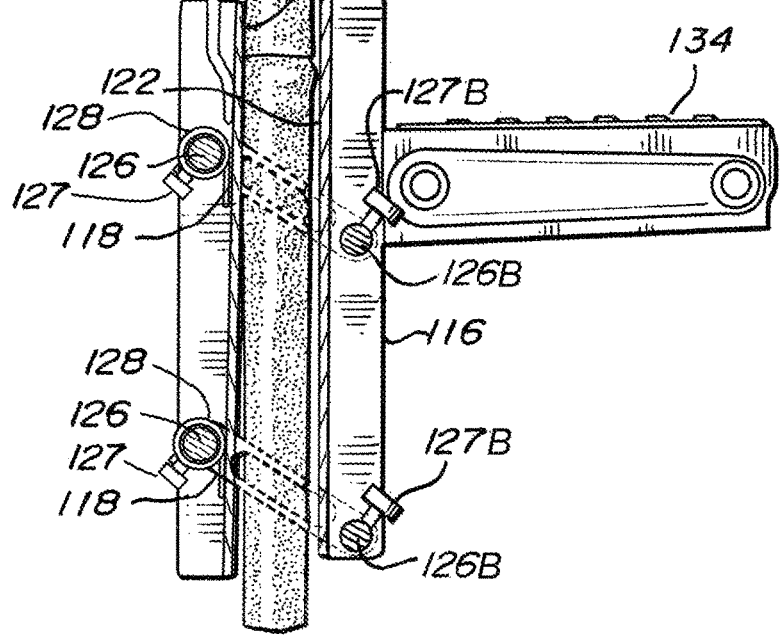
FIG. 11 is a partial cross section of the tool of FIG. 1 grasping the stake.

The pivot pins and stop pins rotate with the links as shown in FIGS. 10 and 11 so that the stop pins' heads interfere with the movable clamping portion as the clamping surfaces become separated by gap 132 and prevent the torsion springs from forcing the movable clamping portion any further. This ensures that the movable clamping portion cannot continue to rotate back onto the fixed clamping member and cause the gap to close. So the normal configuration of the tool when no external forces are applied has the movable clamping portion separated by gap 132 from the fixed clamping member under the bias of the torsion springs and the stop pins engaged against the movable clamping portion.

It should be understood that while the embodiment shown employs only two torsions springs around pins 126 and two stop pins inserted in pins 126B, there may be other arrangements of the springs, screws, and stop pins. For instance, four two torsion springs may be used, all four of the pivot pins may include a stop pin, or a screw may be used in place of one or more of the stop pins where only serving to secure the spring. The diameter of the head of the stop pin is sized to engage the backside of the clamping surface and limit further opening just as maximum gap 132 is reached.

The movable clamping portion further includes an outwardly-extending horizontal step 134, sized and arranged to all the user to place his/her foot thereon as seen in FIG. 7. The step preferably includes a rubber horizontal top surface with non-slip texturing, but such texturing may alternatively be formed on the step itself.

As demonstrated in FIG. 7, when the user, having already placed a stake within the gap 132, preferably with the clamping surface about eight inches above the lower tip of the stake, positions the lower tip of the stake against the ground, steps onto the step, and exerts a downward force on the step with his foot, the movable clamping portion moves against the bias of the torsion springs so the size of the gap is reduced until the stake is firmly grasped between the clamping surfaces, and the downward force then continues to drive the lower tip of the stake into the ground. Because the user can do this while standing comfortably upright and to use his/her body weight to provide both the clamping and driving forces, the effort of inserting such stakes is greatly reduced, and resulting back pain and such is avoided.

Figures 8, 9:
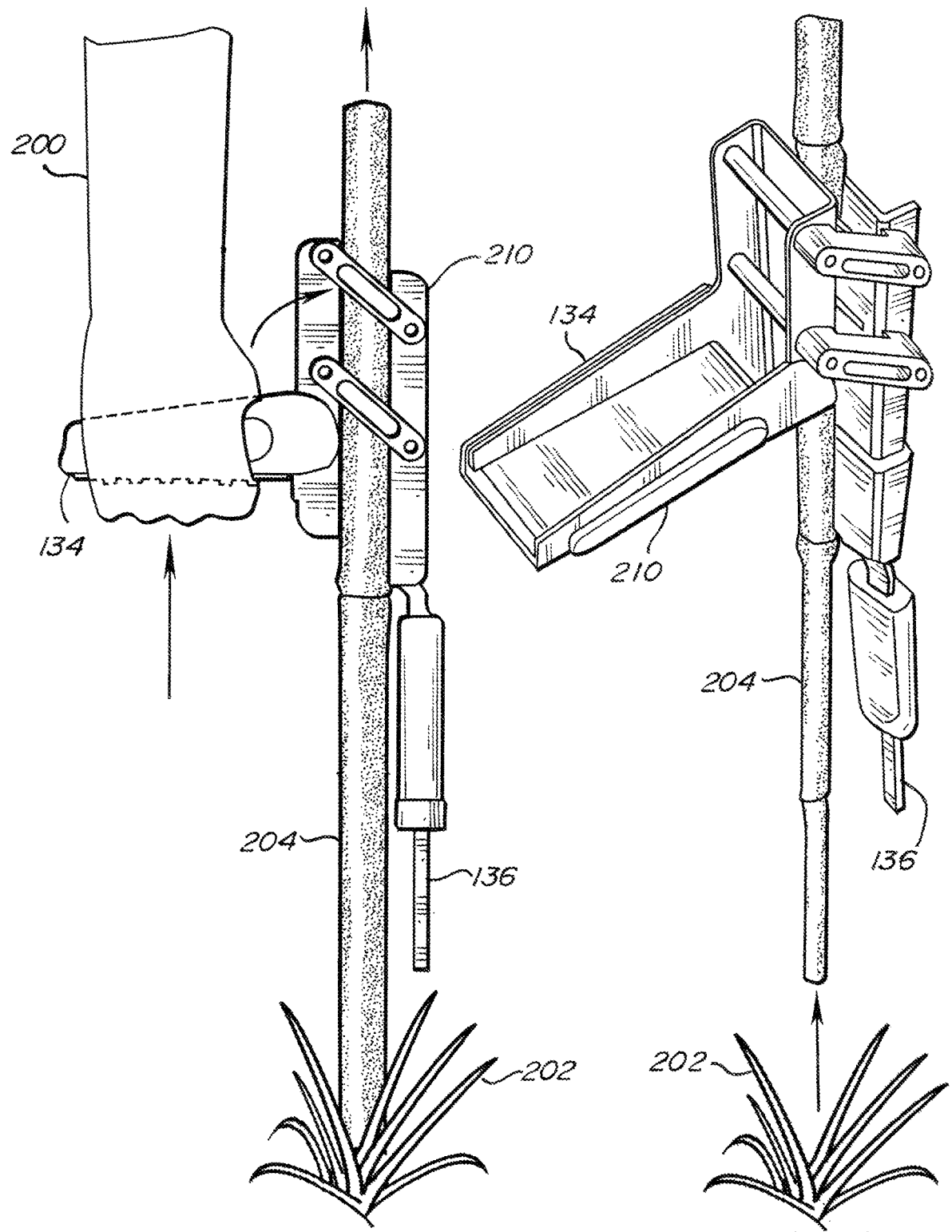
FIG. 8 is a side view of the user removing the stake from the ground using the tool of FIG. 1.
FIG. 9 is a perspective view of the tool of FIG. 1 in its stake removal orientation.

The pole of the pole portion is removable attached to the fixed clamping member by a rod 136 of the fixed clamping member extending upwardly and fitting firmly within a hole (not shown) into the bottom end of the pole. The user simply pulls the rod from the hole to separate the fixed clamping member from the pole, which together with the links, springs, pivot pins and movable clamping portion separates from the pole as a singular subassembly 210. The enables to subassembly to now be used for removing stakes, as shown in FIGS. 8 and 9. The user simply places the subassembly, in an upside-down orientation, around the stake near the ground and grasps the step, and pulls upwardly, causing the clamping surfaces to firmly grasp the stake and pull it from the ground.

It should be appreciated that an increase in force against the step, whether during stake insertion or stake removal, proportionately increases the clamping forces on the stake, so that soils which are firmer and more difficult to insert a stake, naturally requiring more insertion force, will inherently cause the stake to be grasped more firmly.

The present invention may be embodied in or practiced using the described tool, or equivalents thereof, or in a method, or system employing such a tool, which is suitable for home and industrial application of such things as stakes, canes, bamboos, wooden and metal posts, demarcation rods, by one-person operation, without much effort.

The lower end, links, and movable clamping portion may be made of metal or plastic. The clamping surfaces are each six inches tall and one and three-quarters inches wide. The dimensions can be adjusted to increase or decrease the size of the device and the size of the stakes it will accommodate.

The pole is preferably four and a half to five feet long. It may be a telescoping pole to allow shortening for storage. The clamping surfaces engage the stakes over a large surface area, thereby improving grip while avoiding bending or breaking of the stakes.

In preparation for inserting a stake, the tool is preferably positioned to engage the stake approximately eight inches above the ground, to maximize the advantage of the user's body weight and provide maximum comfort to the user during insertion. The user then places his/her foot on step and presses it down, causing the clamping surfaces to apply clamp the stake while driving it firmly into the ground. If stake needs to be further inserted into the ground, the user simply removes the foot from the step, allowing the torsion springs to force the clamping surfaces apart and release the stake, then repositions the tool and repeats the insertion process, again grasping the stake approximately eight inches above the ground.

The clamping surfaces are approximately one and one-eighth inches apart in the non-active position of gap 132. The clamping surfaces and links function as a "collapsing parallelogram" when clamping, and as an "expanding parallelogram" when opening.

The tool may be a combination of metal stampings, punchings, box formings injection moldings, tubings, and wood. The pole may be wooden, plastic, or metallic tubing, such as aluminum.

While the forgoing provides an exemplary embodiment which is meant to demonstrate key aspects and advantages of the invention, it should be understood that the invention is not meant to be limited thereto. The invention should be limited only by the following claims, including all equivalents thereto.

We claim:

1. A stake insertion and removal tool comprising:
   a vertically extending pole portion having an upper end for grasping and a lower end;
   a clamping portion connected to the pole portion approximate the lower end and comprising a fixed clamping surface, a step, and a movable clamping surface connected to the fixed clamping surface by linkage and movable relative to the pole portion through the linkage;
   wherein a single force, being a downwardly-directed force on the step, both forces the movable clamping surface toward the fixed clamping surface to grasp a stake placed therebetween, and simultaneously urges the stake into the ground below.

2. The stake insertion and removal tool of claim 1 wherein the fixed and movable clamping surfaces are substantially planar and include grip-enhancing features, and further comprising one or more springs arranged for biasing the movable clamping surface away from the fixed clamping surface.

3. The stake insertion and removal tool of claim 2 wherein the grip-enhancing features are from the group including teeth, knurling, non-slip texturing, and non-slip coating.

4. The stake insertion and removal tool of claim 3 wherein the movable clamping surface is substantially parallel to the fixed clamping surface.

5. The stake insertion and removal tool of claim 1 wherein the clamping portion is removable as a singular subassembly from the lower end of the vertically extending pole portion.

6. The stake insertion and removal tool of claim 5 wherein the singular subassembly is arranged, when disposed upside-down, such that an upward force on the step biases the movable clamping surface toward the fixed clamping surface through the linkage, thereby forcing the movable clamping surface toward the fixed clamping surface, to grasp the stake placed therebetween as the upward force urges the stake from the ground.

7. The stake insertion and removal tool of claim 6 wherein the fixed and movable clamping surfaces are substantially planar and include grip-enhancing features, and further comprising one or more springs arranged for biasing the movable clamping surface away from the fixed clamping surface.

8. The stake insertion and removal tool of claim 7 wherein the grip-enhancing features are from the group including teeth, knurling, non-slip texturing, and non-slip coating.

9. The stake insertion and removal tool of claim 8 wherein the movable clamping surface is substantially parallel to the fixed clamping surface.

10. The stake insertion and removal tool of claim 9 wherein the movable clamping surface is movable relative to the fixed clamping surface in a collapsing parallelogram relationship, thereby maintaining the clamping surfaces parallel to each other during relative movement.

11. The stake insertion and removal tool of claim 10 wherein the step extends outwardly from the clamping portion perpendicular to the movable clamping surface and comprises a step surface there-atop.

12. The stake insertion and removal tool of claim 11 wherein the step surface is substantially planar and includes non-slip features from the group including teeth, knurling, non-slip texturing, and non-slip coating.

13. The stake insertion and removal tool of claim 12 wherein the linkage comprises a pivot limiter to stop the biased movement of the movable clamping surface away from the fixed clamping surface when a predetermine gap is achieved therebetween.

14. A stake insertion and removal tool comprising:
    a vertically extending pole portion having an upper end for grasping and a lower end;
    a clamping portion connected to the pole portion approximate the lower end and comprising a fixed clamping surface, a step, and a movable clamping surface connected to the fixed clamping surface by linkage and movable relative to the pole portion through the linkage;
    wherein a downward force on the step forces the movable clamping portion toward the fixed clamping portion through the linkage, thereby forcing the movable clamping surface toward the fixed clamping surface, to grasp a stake placed therebetween as the downward force urges the stake into ground there-below;
    wherein the fixed and movable clamping surfaces are substantially planar and include grip-enhancing features;
    and further comprising one or more springs arranged for biasing the movable clamping surface away from the fixed clamping surface;
    wherein the grip-enhancing features are from the group including teeth, knurling, non-slip texturing, and non-slip coating;
    wherein the movable clamping surface is substantially parallel to the fixed clamping surface;
    and wherein the movable clamping portion is movable relative to the fixed clamping surface in a collapsing parallelogram relationship, thereby maintaining the clamping surfaces parallel to each other during relative movement.

15. The stake insertion and removal tool of claim 14 wherein the step extends outwardly from the clamping portion perpendicular to the movable clamping surface and comprises a step surface there-atop.

16. The stake insertion and removal tool of claim 15 wherein the step surface is substantially planar and includes non-slip features.

17. The stake insertion and removal tool of claim 16 wherein the non-slip features are from the group including teeth, knurling, non-slip texturing, and non-slip coating.

18. The stake insertion and removal tool of claim 17 wherein the linkage comprises a pivot limiter to stop the biased movement of the movable clamping surface away from the fixed clamping surface when a predetermine gap is achieved there-between.

19. The stake insertion and removal tool of claim 18 wherein the clamping portion is removable as a singular subassembly from the lower end of the vertically extending pole portion.

20. The stake insertion and removal tool of claim 19 wherein the singular subassembly is arranged, when disposed upside-down, such that an upward force on the step biases the movable clamping surface toward the fixed clamping surface through the linkage, thereby forcing the movable clamping surface toward the fixed clamping surface, to grasp the stake placed therebetween as the upward force urges the stake from the ground.

* * * * *